(12) United States Patent
Zhang et al.

(10) Patent No.: US 11,151,741 B2
(45) Date of Patent: Oct. 19, 2021

(54) SYSTEM AND METHOD FOR OBSTACLE AVOIDANCE

(71) Applicant: SZ DJI TECHNOLOGY CO., LTD., Shenzhen (CN)

(72) Inventors: Honghui Zhang, Shenzhen (CN); Lei Han, Shenzhen (CN); Xiao Hu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 27 days.

(21) Appl. No.: 16/263,880

(22) Filed: Jan. 31, 2019

(65) Prior Publication Data

US 2019/0172215 A1    Jun. 6, 2019

Related U.S. Application Data

(63) Continuation of application No. PCT/CN2016/092681, filed on Aug. 1, 2016.

(51) Int. Cl.
*G06T 7/593*        (2017.01)
*G06T 7/579*        (2017.01)
(Continued)

(52) U.S. Cl.
CPC ............ *G06T 7/593* (2017.01); *B64C 39/024* (2013.01); *B64D 47/08* (2013.01); *G05D 1/101* (2013.01);
(Continued)

(58) Field of Classification Search
CPC ........... G06T 7/593; G06T 7/579; G06T 7/74; G06T 2207/10012; G06T 2207/10016; G06T 2207/30244; G06T 7/70; G06T 7/52; H04N 13/204; H04N 13/128; H04N 2013/0081; B64C 39/024; B64C 2201/02; B64C 2201/00; B64D 47/08; G05D 1/101; G01S 15/86; G01S 17/86; G01S 15/10; G01S 15/93; G01S 15/08; G01C 3/14; G08G 1/166; G01B 11/14
See application file for complete search history.

(56) References Cited

U.S. PATENT DOCUMENTS

| | | | |
|---|---|---|---|
| 2015/0036886 A1* | 2/2015 | Matono | ..................... G01C 3/14 |
| | | | 382/106 |
| 2017/0059704 A1* | 3/2017 | Xie | ......................... G01S 15/10 |
| 2017/0197731 A1* | 7/2017 | Yang | ..................... G05D 1/0669 |

FOREIGN PATENT DOCUMENTS

| | | |
|---|---|---|
| CN | 102774325 A | 11/2012 |
| CN | 103246054 A | 8/2013 |

(Continued)

OTHER PUBLICATIONS

CN105807786 Li et al, machines translated, Jul. 27, 2016 (Year: 2016).*

(Continued)

*Primary Examiner* — Jianxun Yang
(74) *Attorney, Agent, or Firm* — Anova Law Group, PLLC

(57) ABSTRACT

A method for assisting obstacle avoidance of a mobile platform includes determining to use a detection mode from a plurality of detection modes, detecting a characteristic condition of the mobile platform with respect to an obstacle using the detection mode, and directing the mobile platform to avoid the obstacle based on the detected characteristic condition.

17 Claims, 7 Drawing Sheets

(51) Int. Cl.
*G06T 7/73* (2017.01)
*H04N 13/204* (2018.01)
*H04N 13/128* (2018.01)
*B64C 39/02* (2006.01)
*B64D 47/08* (2006.01)
*G05D 1/10* (2006.01)
*H04N 13/00* (2018.01)

(52) U.S. Cl.
CPC ................ *G06T 7/579* (2017.01); *G06T 7/74* (2017.01); *H04N 13/128* (2018.05); *H04N 13/204* (2018.05); *G06T 2207/10012* (2013.01); *G06T 2207/10016* (2013.01); *G06T 2207/30244* (2013.01); *H04N 2013/0081* (2013.01)

(56) References Cited

FOREIGN PATENT DOCUMENTS

| CN | 105807786 A | 7/2016 |
| JP | H10289316 A | 10/1998 |
| WO | 2016106694 A1 | 7/2016 |

OTHER PUBLICATIONS

The World Intellectual Property Organization (WIPO) International Search Report and Written Opinion for PCT/CN2016/092681 dated May 4, 2017 8 pages.

* cited by examiner

SYSTEM AND METHOD FOR OBSTACLE AVOIDANCE

CROSS-REFERENCE TO RELATED APPLICATION

This application is a continuation of International Application No. PCT/CN2016/092681, filed on Aug. 1, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to computer vision technologies and more particularly, but not exclusively, to an obstacle avoidance system.

BACKGROUND

In recent years, unmanned aerial vehicles ("UAVs") have become popular. As UAVs grow in popularity, automatic obstacle avoidance technologies are becoming more and more important. Currently-available solutions are costly and are limited by a distance from the UAV to an obstacle. Some of the solutions are only suitable for positioning an obstacle in a short distance; while, others are better for positioning the obstacle in a long distance.

In view of the foregoing reasons, there is a need for an automatic positioning and obstacle avoidance system and method for positioning and avoiding an obstacle for both short and long distances.

SUMMARY

In accordance with a first aspect disclosed herein, there is set forth a method for detecting an object distance, comprising:
obtaining a disparity between two images of an object, which images are captured using an imaging device; and
determining to use a detection mode to obtain the object distance based on the disparity.

In an exemplary embodiment of the disclosed methods, obtaining the disparity comprises acquiring the disparity between a first image and a second image of the object.

In another exemplary embodiment of the disclosed methods, determining to use the detection mode comprises determining to use a binocular mode or determining to use a monocular mode.

In another exemplary embodiment of the disclosed methods, determining to use the detection mode comprises comparing the disparity with a predetermined disparity threshold level.

In another exemplary embodiment of the disclosed methods, comparing the disparity comprises ascertaining whether the disparity is less than, equal to or greater than the predetermined disparity threshold level.

In another exemplary embodiment of the disclosed methods, determining to use the detection mode comprises:
selecting the monocular mode as a selected detection mode when the disparity is less than the predetermined disparity threshold level; and
selecting the binocular mode as the selected detection mode when the disparity is greater than or equal to the predetermined disparity threshold level.

In another exemplary embodiment of the disclosed methods, determining to use the detection mode comprises maintaining the detection mode when a current operating detection mode is identical with the selected detection mode and switching to the selected detection mode when the current operating detection mode is different from the selected detection mode.

In another exemplary embodiment of the disclosed methods, acquiring the disparity comprises associating a feature point of the first image with a corresponding point of the second image.

In another exemplary embodiment of the disclosed methods, associating the feature point comprises:
scanning the second image to identify a point that is associate with a selected feature point of the first image; and
calculating a similarity between the selected feature point of the first image and the point of the second image.

In another exemplary embodiment of the disclosed methods, determining the disparity comprises calculating an average disparity.

In another exemplary embodiment of the disclosed methods, calculating the average disparity comprises averaging the disparities for each associated feature points between the first image and the second image.

In another exemplary embodiment of the disclosed methods, determining the disparity comprises choosing a maximum disparity or a minimum disparity.

In another exemplary embodiment of the disclosed methods, choosing comprises selecting the maximum disparity or the minimum disparity from the disparities for each associated feature points between the first image and the second image.

In another exemplary embodiment of the disclosed methods, selecting the binocular mode comprises acquiring the object distance with the binocular mode.

In another exemplary embodiment of the disclosed methods, acquiring the object distance with the binocular mode comprises using a binocular imaging device.

In another exemplary embodiment of the disclosed methods, acquiring the object distance with the binocular mode comprises simultaneously capturing the first and second images.

In another exemplary embodiment of the disclosed methods, capturing the first and second images comprises:
capturing the first image with a first lens of the imaging device; and
capturing the second image with a second lens of the imaging device.

In another exemplary embodiment of the disclosed methods, acquiring the object distance with the binocular mode comprises determining a baseline between the first lens and the second lens.

In another exemplary embodiment of the disclosed methods, acquiring the object distance comprises calculating the object distance using a binocular triangulation.

In another exemplary embodiment of the disclosed methods, selecting the monocular mode comprises acquiring the object distance with the monocular mode.

In another exemplary embodiment of the disclosed methods, acquiring the object distance with the monocular mode comprises capturing the first and second images of the object at two different first times with the imaging device.

In another exemplary embodiment of the disclosed methods, acquiring the object distance comprises determining a displacement of the imaging device based on a time lapse between the two different first times, a velocity and a rotation.

In another exemplary embodiment of the disclosed methods, acquiring the object distance comprises calculating the object distance via a monocular triangulation.

In accordance with another aspect disclosed herein, there is set forth an apparatus for detecting an object distance, comprising:

an imaging device for capturing two images of an object; and one or more processors, individually or collectively, operate to:

obtain a disparity between the two images; and determine to use a detection mode to obtain the object distance based on the disparity.

In an exemplary embodiment of the disclosed apparatus, the imaging device is configured to capture a first image and a second image of the object.

In another exemplary embodiment of the disclosed apparatus, the one or more processors are configured to determine to use a binocular mode or a monocular mode.

In another exemplary embodiment of the disclosed apparatus, the one or more processors are configured to determine to use the detection mode by comparing the disparity with a predetermined disparity threshold level.

In another exemplary embodiment of the disclosed apparatus, the one or more processors are configured to ascertain whether the disparity is less than, equal to or greater than the predetermined disparity threshold level.

In another exemplary embodiment of the disclosed apparatus, the one or more processors are configured to:

select the monocular mode as a selected detection mode when the disparity is less than the predetermined disparity threshold level; and select the binocular mode as the selected detection mode when the disparity is greater than or equal to the predetermined disparity threshold level.

In another exemplary embodiment of the disclosed apparatus, the one or more processors are configured to:

maintain the detection mode when a current operating detection mode is identical with the selected detection mode; and switch to the selected detection mode when the current operating detection mode is different from the selected detection mode.

In another exemplary embodiment of the disclosed apparatus, the one or more processors are configured to associate a feature point of the first image with a corresponding point of the second image.

In another exemplary embodiment of the disclosed apparatus, the one or more processors are configured to:

scan the second image to identify a point that is associate with a selected feature point of the first image; and calculate a similarity between the selected feature point of the first image and the point of the second image.

In another exemplary embodiment of the disclosed apparatus, the one or more processors are configured to calculate an average disparity as the disparity.

In another exemplary embodiment of the disclosed apparatus, the one or more processors are configured to average the disparities for each associated feature points between the first image and the second image.

In another exemplary embodiment of the disclosed apparatus, the one or more processors are configured to choose a maximum disparity or a minimum disparity.

In another exemplary embodiment of the disclosed apparatus, the one or more processors are configured to select the maximum disparity or the minimum disparity from the disparities for each associated feature points between the first image and the second image.

In another exemplary embodiment of the disclosed apparatus, the one or more processors are configured to acquire the object distance with the binocular mode when the binocular mode is selected.

In another exemplary embodiment of the disclosed apparatus, the imaging device is a binocular imaging device at the binocular mode.

In another exemplary embodiment of the disclosed apparatus, the imaging device is configured to capture the first and second images simultaneously at the binocular mode.

In another exemplary embodiment of the disclosed apparatus, the first image is captured with a first lens of the imaging device, and the second image is captured with a second lens of the imaging device.

In another exemplary embodiment of the disclosed apparatus, the one or more processors are configured to determine a baseline between the first lens and the second lens.

In another exemplary embodiment of the disclosed apparatus, the one or more processors are configured to calculate the object distance using a binocular triangulation.

In another exemplary embodiment of the disclosed apparatus, the one or more processors are configured to acquire the object distance with the monocular mode.

In another exemplary embodiment of the disclosed apparatus, the imaging device is configured to capture the first and second images of the object at two different first times.

In another exemplary embodiment of the disclosed apparatus, the one or more processors are configured to determine a displacement of the imaging device based on a time lapse between the two different first times, a velocity and a rotation.

In another exemplary embodiment of the disclosed apparatus, the one or more processors are configured to calculate the object distance via a monocular triangulation.

In accordance with another aspect disclosed herein, there is set forth a method for assisting obstacle avoidance of a mobile platform, comprising:

determining to use a detection mode from a plurality of detection modes;

detecting a characteristic condition of the mobile platform with respect to an obstacle; and directing the mobile platform to avoid the obstacle based on the detected characteristic condition.

In an exemplary embodiment of the disclosed methods, determining to use the detection mode comprises determining to use a binocular mode or determining to use a monocular mode.

In another exemplary embodiment of the disclosed methods, detecting the characteristic condition comprises detecting an obstacle distance using the detection mode.

In another exemplary embodiment of the disclosed methods, detecting the characteristic condition comprises performing motion estimation for the mobile platform with respect to the obstacle using the operation mode.

Exemplary embodiments of the disclosed methods further comprise directing the mobile platform to avoid the obstacle based on the at least one of distance and the motion estimation.

In another exemplary embodiment of the disclosed methods, determining to use the detection mode comprises:

obtaining a disparity between two images of the obstacle, which images are captured using an imaging device; and determining the detection mode based on the disparity.

In another exemplary embodiment of the disclosed methods, obtaining the disparity comprises acquiring the disparity between a first image and a second image of the obstacle.

In another exemplary embodiment of the disclosed methods, determining to use the detection mode comprises comparing the disparity with a predetermined disparity threshold level.

In another exemplary embodiment of the disclosed methods, comparing the disparity comprises ascertaining whether the disparity is less than, equal to or greater than the predetermined disparity threshold level.

In another exemplary embodiment of the disclosed methods, determining to use the detection mode comprises:

selecting the monocular mode as a selected detection mode when the disparity is less than the predetermined disparity threshold level; and selecting the binocular mode as the selected detection mode when the disparity is greater than or equal to the predetermined disparity threshold level.

In another exemplary embodiment of the disclosed methods, determining to use the detection mode comprises maintaining the detection mode when a current detection mode is identical with the selected detection mode and switching to the selected detection mode when the current detection mode is different from the selected detection mode.

In another exemplary embodiment of the disclosed methods, acquiring the disparity comprises associating each feature point of the first image with a corresponding point of the second image.

Exemplary embodiments of the disclosed methods further comprise generating a stereoscopic cloud of the obstacle based on the feature points and the obstacle distance.

In another exemplary embodiment of the disclosed methods, selecting the binocular mode comprises acquiring the obstacle distance with the binocular mode.

In another exemplary embodiment of the disclosed methods, acquiring the obstacle distance with the binocular mode comprises using a binocular imaging device.

In another exemplary embodiment of the disclosed methods, acquiring the obstacle distance with the binocular mode comprises simultaneously capturing the first and second images.

In another exemplary embodiment of the disclosed methods, capturing the first and second images comprises:

capturing the first image with a first lens of the imaging device; and capturing the second image with a second lens of the imaging device.

In another exemplary embodiment of the disclosed methods, acquiring the obstacle distance with the binocular mode comprises determining a baseline between the first lens and the second lens.

In another exemplary embodiment of the disclosed methods, acquiring the obstacle distance with the binocular mode comprises calculating the obstacle distance using a binocular triangulation.

In another exemplary embodiment of the disclosed methods, performing the motion estimation comprises performing the motion estimation with the binocular mode.

In another exemplary embodiment of the disclosed methods, performing the motion estimation with the binocular mode comprises determining a motion transformation between different times.

In another exemplary embodiment of the disclosed methods, determining the motion transformation comprises acquiring a velocity, a rotation and an orientation of the imaging device for the motion transformation.

In another exemplary embodiment of the disclosed methods, acquiring the velocity, the rotation and the rotation comprises acquiring the velocity, the orientation and the rotation via an inertial measurement unit ("IMU").

In another exemplary embodiment of the disclosed methods, performing the motion estimation comprises refreshing the obstacle distance and/or the motion estimation with at least one of the stereoscopic cloud and the obstacle distance being acquired with the binocular mode.

In another exemplary embodiment of the disclosed methods, selecting the monocular mode comprises acquiring the obstacle distance with the monocular mode.

In another exemplary embodiment of the disclosed methods, acquiring the obstacle distance with the monocular mode comprises capturing the first and second images of the obstacle at two different times with a predetermined monocular imaging interval.

In another exemplary embodiment of the disclosed methods, acquiring the obstacle distance comprises determining a displacement of the imaging device between the two different times.

In another exemplary embodiment of the disclosed methods, acquiring the obstacle distance with the monocular mode comprises calculating the obstacle distance via a monocular triangulation.

In another exemplary embodiment of the disclosed methods, performing the motion estimation comprises performing the motion estimation with the monocular mode.

In another exemplary embodiment of the disclosed methods, performing the motion estimation with the monocular mode comprises determining a plurality of transformations between two refreshing times.

In another exemplary embodiment of the disclosed methods, determining the plurality of transformations comprises acquiring a velocity, a rotation and an orientation of the imaging device for each of the plurality of transformations.

In another exemplary embodiment of the disclosed methods, performing the motion estimation comprises refreshing the obstacle distance and/or the motion estimation with at least one of the stereoscopic cloud and the obstacle distance being acquired with the monocular mode.

In another exemplary embodiment of the disclosed methods, directing the mobile platform comprises controlling the mobile platform based on at least one of the stereoscopic cloud, the obstacle distance and the motion estimation.

In another exemplary embodiment of the disclosed methods, controlling the mobile platform comprises adjusting a movement status of the mobile platform.

In another exemplary embodiment of the disclosed methods, adjusting the movement status comprises changing or maintaining at least one of a velocity and a direction of the mobile platform.

In another exemplary embodiment of the disclosed methods, directing the mobile platform comprises:

detecting a characteristic condition of the mobile platform with respect to a plurality of obstacles respectively; and operating the mobile platform to avoid the plurality of obstacles based on the characteristic condition.

In accordance with another aspect disclosed herein, there is set forth computer program product comprising instructions for avoiding an obstacle, being configured to perform the avoiding process in accordance with any one of previous embodiments of the disclosed methods.

In accordance with another aspect disclosed herein, there is set forth an unmanned aerial vehicle ("UAV"), comprising:

a plurality of propellers for providing a lifting power; and
one or more processors, individually or collectively, operate to:

determine a detection mode from a plurality of detection modes;

detect a characteristic condition of the mobile platform with respect to an obstacle; and direct the UAV via the propellers to avoid the obstacle based on the detected characteristic condition.

In accordance with another aspect disclosed herein, there is set forth an apparatus for assisting obstacle avoidance of a mobile platform, comprising one or more processors, individually or collectively, operate to:

determine to use a detection mode from a plurality of detection modes;

detect a characteristic condition of the mobile platform with respect to an obstacle; and direct the mobile platform to avoid the obstacle based on the detected characteristic condition.

In an exemplary embodiment of the disclosed apparatus, the detection mode comprises a binocular mode or a monocular mode.

In another exemplary embodiment of the disclosed apparatus, the one or more processors are configured to detect an obstacle distance using the detection mode.

In another exemplary embodiment of the disclosed apparatus, the one or more processors are configured to perform motion estimation for the mobile platform with respect to the obstacle using the operation mode.

In another exemplary embodiment of the disclosed apparatus, the one or more processors are configured to direct the mobile platform to avoid the obstacle based on the at least one of distance and the motion estimation.

Exemplary embodiments of the disclosed apparatus further comprise an imaging device for capturing a first image and a second image of the obstacle.

In another exemplary embodiment of the disclosed apparatus, the one or more processors are configured to:

obtain a disparity between the first image and the second image; and determine to use the detection mode based on the disparity.

In another exemplary embodiment of the disclosed apparatus, the one or more processors are configured to compare the disparity with a predetermined disparity threshold level.

In another exemplary embodiment of the disclosed apparatus, the one or more processors are configured to ascertain whether the disparity is less than, equal to or greater than the predetermined disparity threshold level.

In another exemplary embodiment of the disclosed apparatus, the one or more processors are configured to:

select the monocular mode as a selected detection mode when the disparity is less than the predetermined disparity threshold level; and select the binocular mode as the selected detection mode when the disparity is greater than or equal to the predetermined disparity threshold level.

In another exemplary embodiment of the disclosed apparatus, the one or more processors are configured to:

maintain the detection mode when a current detection mode is identical with the selected detection mode; and switch to the selected detection mode when the current detection mode is different from the selected detection mode.

In another exemplary embodiment of the disclosed apparatus, the one or more processors are configured to associate each feature point of the first image with a corresponding point of the second image.

In another exemplary embodiment of the disclosed apparatus, the one or more processors are configured to generate a stereoscopic cloud of the obstacle based on the feature points and the obstacle distance.

In another exemplary embodiment of the disclosed apparatus, the one or more processors are configured to acquire the obstacle distance with the binocular mode.

In another exemplary embodiment of the disclosed apparatus, the imaging device is a binocular imaging device at the binocular mode.

In another exemplary embodiment of the disclosed apparatus, the imaging device is configured to capture the first and second images simultaneously at the binocular mode.

In another exemplary embodiment of the disclosed apparatus, the first image is captured with a first lens of the imaging device, and the second image is captured with a second lens of the imaging device.

In another exemplary embodiment of the disclosed apparatus, the one or more processors are configured to determine a baseline between the first lens and the second lens.

In another exemplary embodiment of the disclosed apparatus, the one or more processors are configured to calculate the obstacle distance using a binocular triangulation.

In another exemplary embodiment of the disclosed apparatus, the one or more processors are configured to perform the motion estimation with the binocular mode.

In another exemplary embodiment of the disclosed apparatus, the one or more processors are configured to determine to use a motion transformation between different times.

In another exemplary embodiment of the disclosed apparatus, the motion transformation comprises a velocity, a rotation and an orientation of the imaging device.

Exemplary embodiments of the disclosed apparatus further comprise an inertial measurement unit ("IMU") for acquiring the velocity, the rotation and the rotation.

In another exemplary embodiment of the disclosed apparatus, the one or more processors are configured to refresh the obstacle distance and/or the motion estimation with at least one of the stereoscopic cloud and the obstacle distance being acquired with the binocular mode.

In another exemplary embodiment of the disclosed apparatus, the one or more processors are configured to acquire the obstacle distance with the monocular mode.

In another exemplary embodiment of the disclosed apparatus, the first and second images of the obstacle are captured at two different times with a predetermined monocular imaging interval when the monocular mode is selected.

In another exemplary embodiment of the disclosed apparatus, the one or more processors are configured to determine a displacement of the imaging device between the two different times.

In another exemplary embodiment of the disclosed apparatus, the one or more processors are configured to calculate the obstacle distance via a monocular triangulation.

In another exemplary embodiment of the disclosed apparatus, the one or more processors are configured to perform the motion estimation with the monocular mode.

In another exemplary embodiment of the disclosed apparatus, the one or more processors are configured to determine a plurality of transformations between two refreshing times.

In another exemplary embodiment of the disclosed apparatus, the one or more processors are configured to acquire a velocity, a rotation and an orientation of the imaging device for each of the plurality of transformations.

In another exemplary embodiment of the disclosed apparatus, the one or more processors are configured to refresh the obstacle distance and/or the motion estimation with at least one of the stereoscopic cloud and the obstacle distance being acquired with the monocular mode.

In another exemplary embodiment of the disclosed apparatus, the one or more processors are configured to control the mobile platform based on at least one of the stereoscopic cloud, the obstacle distance and the motion estimation.

In another exemplary embodiment of the disclosed apparatus, the one or more processors are configured to control the mobile platform by adjusting a movement status of the mobile platform.

In another exemplary embodiment of the disclosed apparatus, the one or more processors are configured to adjust the movement status by changing or maintaining at least one of a velocity and a direction of the mobile platform.

In another exemplary embodiment of the disclosed apparatus, the one or more processors are configured to:

detect a characteristic condition of the mobile platform with respect to a plurality of obstacles respectively; and operate the mobile platform to avoid the plurality of obstacles based on the characteristic condition.

Figure 1:
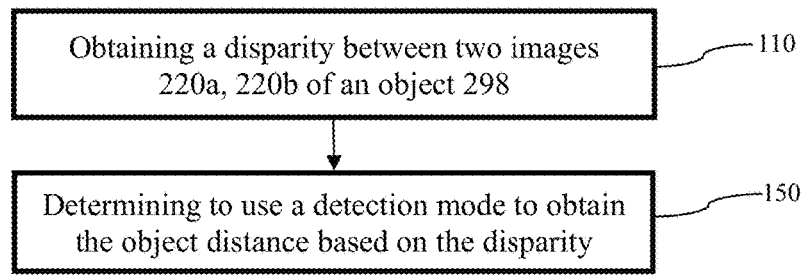
FIG. 1 is a top-level flowchart illustrating an exemplary embodiment of a method for detecting an object distance with a detection mode selected based on a disparity between two images.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available obstacle detection and avoidance systems operating on Unmanned Aerial Vehicles ("UAVs") have limited ability to detect an obstacle at both short and long distances, a system for positioning and avoiding obstacles by switching between different detection modes can prove desirable and provide a basis for obstacle detecting and avoiding systems operating on the UAVs. This result can be achieved, according to one embodiment of a detection method 100 as illustrated in FIG. 1.

Turning to FIG. 1, the detection method 100 is shown as including a detection mode for obtaining an object distance can be determined based on a disparity between two images of an object 298. The object distance is a distance between a mobile platform 501 (shown in FIG. 16) and the object 298. In FIG. 1, a disparity between two images of an object 298 can be obtained for stereo matching, at 110. The images can be captured using an imaging device 503 that can be a binocular imaging device 280 (shown in FIG. 3) installed on a mobile platform 501, e.g., an Unmanned Aerial Vehicle ("UAV") 508 (shown in FIG. 16).

The imaging device 503 can be a binocular imaging device 280 with two lenses 210a, 210b (collectively shown in FIG. 3) for capturing the images at a same moment. The images can be images captured with at least a portion of overlapping area between the images. There can be a distance between the lenses 210*a*, 210*b*, which distance can form a baseline. The baseline can result in a disparity between the images of the object 298. The disparity, also known as a binocular disparity, refers to a difference in image location of a point being seen by the lenses 210*a*, 210*b*. The disparity can be used to determine an object distance from the images in stereopsis. Additional detail regarding the disparity and the determination of the object distance will be set forth with reference to FIG. 3.

The disparity of the images can be used to determine the detection mode, at 150. The detection mode can be used for obtaining the object distance, at 150. The detection mode, for example, can be a selected operation mode of the mobile platform 501 for detecting an object distance to the object 298 and/or for avoiding an obstacle in a navigation path of the mobile platform 591. The obstacle can be the object 298 in an operating environment of the mobile platform 501. The mobile platform 501 can support any predetermined number and/or type of detection and other operation modes. In some embodiments, the operation modes can include a binocular mode and/or a monocular mode.

In some embodiments, the binocular mode, which is a simple method for measuring object distance, can operate properly for detecting the object 298 when the disparity is greater than or equal to a certain threshold value. Here, the closer the object 298, the larger the disparity can become. Thus, the binocular mode can operate properly when the object 298 is in a certain range, e.g. when the disparity is sufficient for stereo matching. On the other hand, when the object distance is beyond the certain range, e.g. when the disparity becomes insufficient for stereo matching, the monocular mode can be employed because the binocular mode may not be satisfactory in determining the distance of a remote object. Additional detail regarding the threshold value will be set forth in FIG. 4.

Based upon the disparity, the detection method 100 can select among the various detection modes of the mobile platform 501. Stated somewhat differently, the detection method 100 can select the detection mode of the mobile platform 501 that operates properly based upon the disparity. In some embodiments, by switching among the detection modes, e.g., between the binocular mode and the monocular mode, based on the disparity, the mobile platform 501 advantageously can help ensure an optimized detection result at both short and long distances. The detection result is an optimized detection when a better detection mode is selected under a condition, e.g., the disparity. Thereby, the mobile platform 501 can avoid the obstacle in its navigation path with obstacle information in a wide range of distances.

Although shown and described as using the binocular mode or the monocular mode for purposes of illustration only, the detection mode can include any other suitable operation modes of the mobile platform 501.

Figure 2:
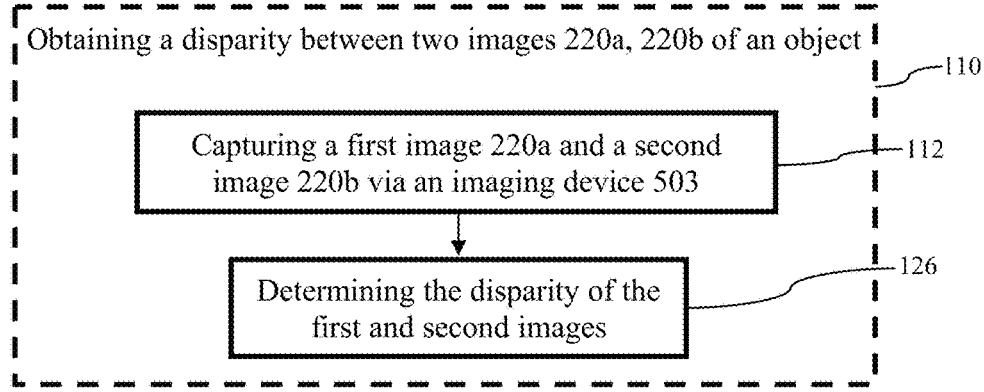
FIG. 2 is a detail flowchart illustrating an alternative embodiment of the method of FIG. 1, wherein the disparity is obtained by capturing the two images.

FIG. 2 illustrates an alternative embodiment of the detection method 100. Turning to FIG. 2, the disparity between the two images of the object 298 can be obtained, at 110, as discussed above with reference to FIG. 1. FIG. 2 shows that the disparity can be obtained by capturing a first image 220*a* and a second image 220*b* of the object 298, at 112. The first and second images 220*a*, 220*b*, for example, can be captured via an imaging device 503.

The imaging device 503 can comprise any suitable type of conventional image device, such as a video and/or still camera. In one embodiment the imaging device 503 can include a binocular imaging device 280 with two separate lenses 210*a*, 210*b* (collectively shown in FIG. 3) for respectively capturing the first image 220*a* and the second image 220*b* at a same time. The lenses 210*a*, 210*b* can be operated to capture images of the object 298 with at least a portion of overlapping area. Alternatively, the imaging device 503 can include a monocular imaging device 290 (shown in FIG. 9) for capturing the first image 220*a* and the second image 220*b* at two different, respective times. In other words, the monocular imaging device 290 can capture the first image 220*a* at a first time and can capture the second image 220*b* at a second time that is different from the first time. Additional detail regarding capturing the first image 220*a* and the second image 220*b* at the different times will be set forth with reference to FIG. 9.

The disparity between the first image 220*a* and the second image 220*b* can be determined, at 126. As shown and described herein, the first image 220*a* and the second image 220*b* can be two images of the same object 298 with at least a portion of overlapping area between the images 220*a*, 220*b*. The disparity between the first image 220*a* and the second image 220*b* can result from a separation (or a baseline) between the lenses 210*a*, 210*b* for capturing the images 220*a*, 220*b*. The disparity between the images 220*a*, 220*b* can be decided by, e.g., matching feature points of the first image 220*a* with corresponding points of the second image 220*b*. The disparity can be an average disparity, a maximum disparity or a minimum disparity among the feature points.

Although shown and described as capturing the images 220*a*, 220*b* via the binocular imaging device 280 or the monocular imaging device 290 for purposes of illustration only, the images 220*a*, 220*b* can be captured via any other suitably configured imaging device.

Figure 3:
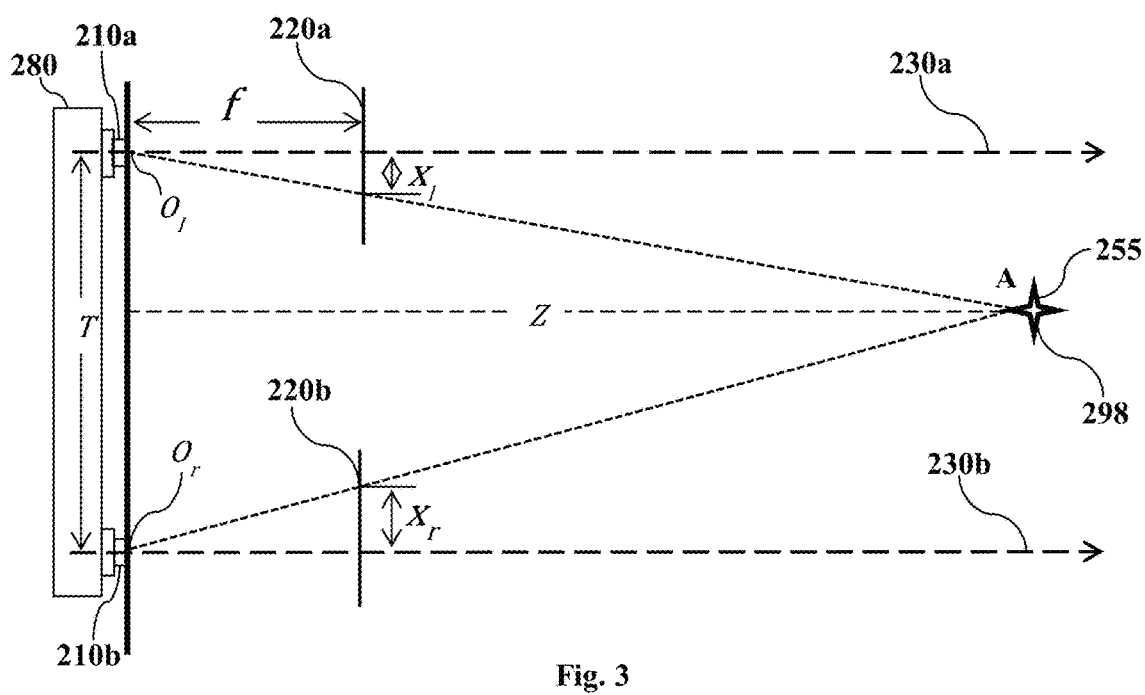
FIG. 3 is an exemplary diagram illustrating an embodiment of a triangulation method, wherein the disparity between the two images is determined by binocular triangulation.

FIG. 3 illustrates an embodiment of an exemplary triangulation method 200. Turning to FIG. 3, the triangulation method 200 for stereo matching can determine a disparity d between the images 220*a*, 220*b* for an object 298. The images 220*a*, 220*b* are acquired by the respective lenses 210*a*, 210*b* of the imaging device 280. In FIG. 3, the disparity d between the images 220*a*, 220*b* can be determined via a triangulation. In an exemplary embodiment, a feature point 255 of the object 298 having an index i, represented by its coordinates ($X_i$, $Y_i$, $Z_i$), can be given as follows:

$$X_i = \frac{T}{d}(x_i^l - c_x), \quad \text{Equation (1)}$$

$$Y_i = \frac{T}{d}(y_i^l - c_y), \quad \text{Equation (2)}$$

$$Z_i = \frac{T}{d}f \quad \text{Equation (3)}$$

where $c_x$ and $c_y$ represent respective center $O_l$, $O_r$ coordinates of the lenses 210*a*, 210*b*, $x_i$ and $y_i$ represent the coordinates of the object 298 in each of the images 220*a* and 220*b*, respectively, T represents the baseline (in other words, the distance between the center coordinates of the lenses 210*a*, 210*b*), f is a rectified focal length of the lenses 210*a* and 210*b*, $i$ is an index over multiple objects 298 and/or over multiple feature points 255 of the object 298, and d is the disparity between the images 220*a* and 220*b*, represented here as:

$$d_i = x_i^l - x_i^r \quad \text{Equation (4)}$$

A selected disparity $d_i$ can be calculated by matching a point $X_r$ of the second image 220*b* with the feature point $X_l$ of the first image 220*a*, wherein the $X_l$ is a known element.

The matching point $X_r$ of the second image 220b can be located with any suitable manner, e.g., by matching a three-by-three pixel matrix around a feature point. In Equation (5), $I^L$ represents the first image 220a, and $I^R$ represents the second image 220b of the same object 298. A point $x_i^l$ of the first image 220a can be known, and a matching point $x_i^r$ of the second image 220b can be defined as a point that is "most similar" to the point $x_i^l$ of the first image 220a, which can be represented with the following equation:

$$d = \mathrm{argmin}_d |I^L(x_l) - I^R(x_l + d)| \qquad \text{Equation (5)}$$

where d represents the disparity of the images being captured by the lenses 210a, 210b, $I^L$ refers to the first image 220a, $I^R$ refers to the second image 220b of the same object 298, $x_l$ is the point $x_i^l$ of the first image 220a.

In some embodiments, a predetermined number of feature points 255 can be selected from the first image 220a and be matched to the second image 220b. The disparity d between the first image 220a and the second image 220b can be selected as an average disparity among calculated disparities of the feature points 255. Exemplary types of averages can include an arithmetic mean, a geometric mean, a median, and/or a mode without limitation. Optionally, the disparity d can be selected from a maximum disparity or a minimum disparity from the calculated disparities of the feature points 255. The disparity d can be used to determine the detection mode of a mobile platform 501 (shown in FIG. 16).

Although shown and described as using triangulation to determine the disparity d between the images 220a, 220b for purposes of illustration only, other alternative suitable manners for determining the disparity d can be used.

Figure 4:
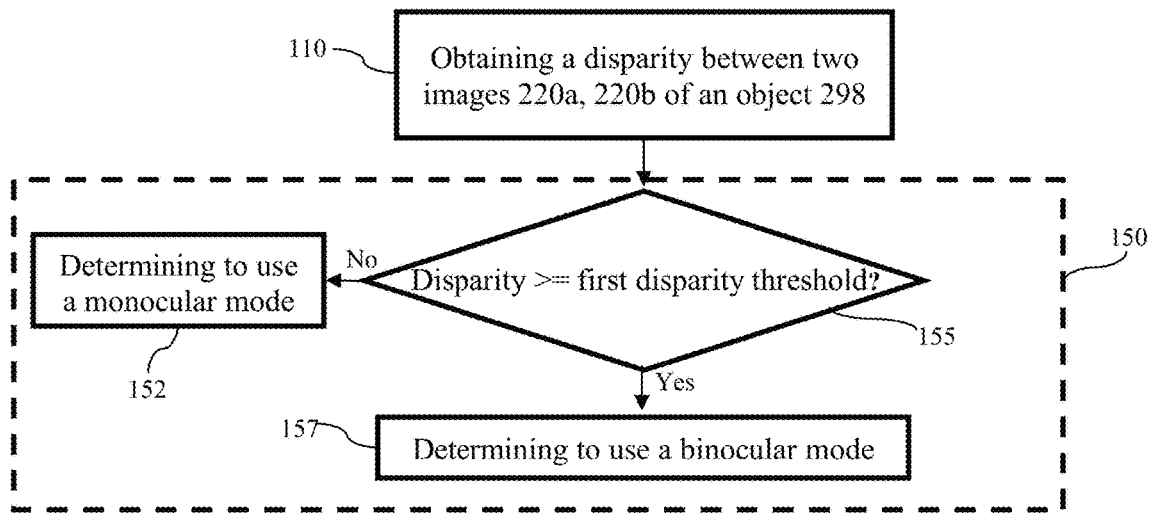
FIG. 4 is a detail flowchart illustrating another alternative embodiment of the method of FIG. 1, wherein the detection mode is determined according to a comparison result of the disparity.

FIG. 4 illustrates an alternative embodiment of the detection method 100. Turning to FIG. 4, the disparity between the images 220a, 220b of the object 298 can be obtained, at 110, in a manner set forth above. The detection mode of the mobile platform 501 (shown in FIG. 16) can be determined, at 150, according to a comparison between the disparity and a first disparity threshold as illustrated in FIG. 4. The disparity can be compared with the first disparity threshold, at 155.

The first disparity threshold can be represented by a pixel count and can be any selected value within a predetermined disparity range between one pixel and ten pixels, or more. In some embodiments, the first disparity threshold can be between one pixel and three pixels. When the disparity is determined to be greater than or equal to the first disparity threshold, at 155, a binocular mode of the mobile platform 501 can be determined (or selected) as the detection mode of the mobile platform 501, at 157. With the binocular mode selected, a binocular imaging device 280 (shown in FIG. 3) can be used to avoid an obstacle. For example, the binocular imaging device 280 can enable the mobile platform 501 to avoid the obstacle by detecting the object distance, constructing a stereoscopic cloud and estimating a motion of the mobile platform 501 with respect to the obstacle. Additionally and/or alternatively, in the binocular mode, the binocular imaging device 280 can be facilitated with other devices, e.g., an Inertial Measurement Unit ("IMU") (not shown) for detecting a status of the mobile platform 501. Additional detail regarding the IMU will be set forth with reference to FIG. 13.

The binocular mode can provide certain precision when the disparity is greater than or equal to a first disparity threshold. When the disparity is less than the first disparity threshold, the binocular mode can be unable to provide the precision. In such a case, the mobile platform 501 can be determined (or selected) to use the monocular mode for reliably and satisfactorily detecting the object distance, constructing the stereoscopic cloud and estimating the motion of the mobile platform 501 with respect to the obstacle.

Therefore, when the disparity is determined to be less than the first disparity threshold, at 155, the monocular mode can be determined (or selected) as the detection mode of the mobile platform 501, at 152. With the monocular mode selected, a monocular imaging device 290 (shown in FIG. 9) can be used to avoid the obstacle. Additionally and/or alternatively, in the monocular mode, the monocular imaging device 290 can also be facilitated with other devices, e.g., the IMU.

Although shown and described as using the monocular imaging device 290 in the monocular mode for purposes of illustration only, the monocular mode can also use the binocular imaging device 280 for capturing the first image 220a at a first time and/or the second image 220b at a second time that is different from the first time.

Figure 5:
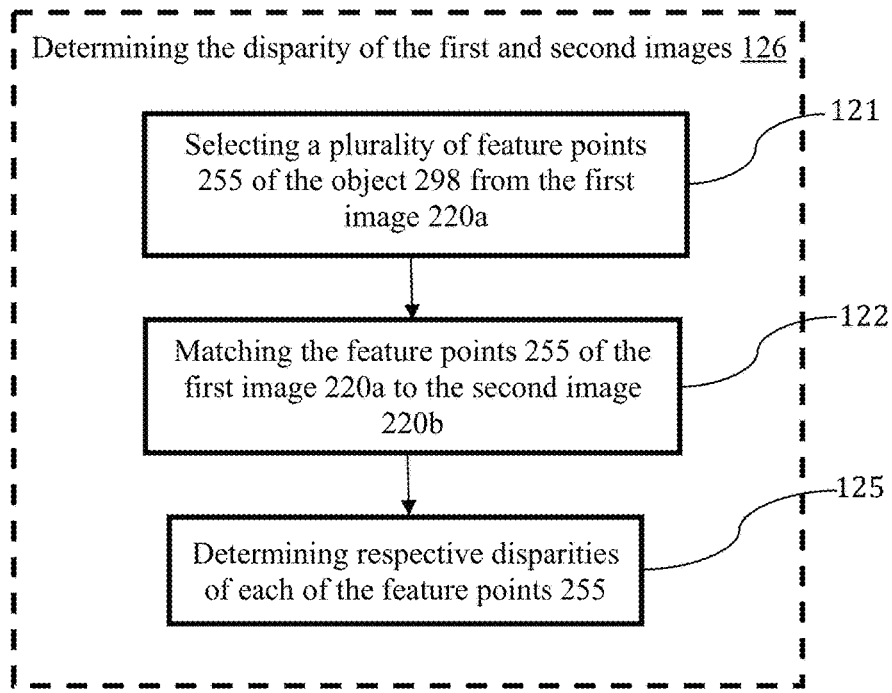
FIG. 5 is a detail flowchart illustrating another alternative embodiment of the method of FIG. 1, wherein the disparity is determined from a plurality of feature points.

FIG. 5 illustrates another alternative embodiment of the detection method 100. Turning to FIG. 5, the disparity of the first and second images 220a, 220b is shown as being determined, at 126, from a plurality of feature points 255.

In FIG. 5, the plurality of feature points 255 of the object 298 can be selected, at 121. The plurality of feature points 255 can be selected from the first image 220a, at 121, and can be identified using one or more of a variety of different manners. In one exemplary embodiment, the feature points 255 can be identified by predefined shapes of the object 298. In another embodiment, the feature points 255 can be recognized as one or more portions of the object 298 having a particular color and/or intensity. In an alternative embodiment, the feature points 255 of the object 298 can be selected at random. In another alternative embodiment, the feature points 255 can be selected at regularly spaced intervals of the first image 220a of the object 298, for example, every pixel, every other pixel, every third pixel, every fourth pixel, and so forth. The feature points 255 can take varying shapes and sizes, as desired. In some embodiments, a combination of two or more of the manners described above can be used to select the feature points 255.

At 122, the selected feature points 255 of the first image 220a can be matched to the second image 220b. In an exemplary embodiment, each of the feature points 255 of the first image 220a can be matched to the second image 220b. A point of the second image 220b is matched to the feature point 255 of the first image 220a when there a similarity between the two points.

At 125, respective feature disparities between each of the feature points 255 of the first image 220a and the second image 220b can be determined, at 125. A feature disparity can refer to a disparity between a selected feature point 255 of the first image 220a and a corresponding of the second image 220b. Each feature disparity, for example, can be determined in a manner set forth with reference to FIG. 3. The disparity d can be determined via any of a variety of manners based on the disparities of the feature points 255. In one embodiment, the disparity d can be found based on an average of the disparities d of the feature points 255. Exemplary types of averages can include an arithmetic mean, a geometric mean, a median, and/or a mode without limitation. In another embodiment, the disparity d can be found by selecting one or more of the feature points 255 and acquiring the disparity d based on the selected feature points 255. In exemplary embodiments, a maximum disparity or a minimum disparity can be chosen as the disparity between the first image 220a and the second image 220b.

Although shown and described as determining the feature disparity via matching each of the feature points 255 between the first image 220a and the second image 220b for purposes of illustration only, any other suitable approach can be applied to determine the feature disparity for each feature points.

Figure 6:
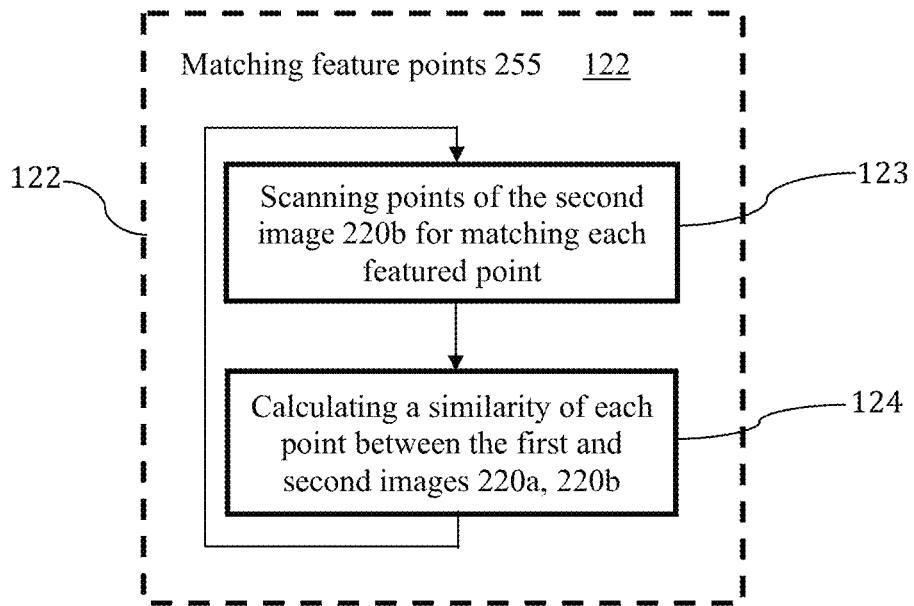
FIG. 6 is a detail flowchart illustrating an alternative embodiment of the method of FIG. 5, wherein each feature point is matched to obtain the disparity.

FIG. 6 illustrates another alternative embodiment of the detection method 100. In the manner set forth above with reference to FIG. 5, each of the feature points 255 can be matched, at 122. FIG. 6 shows that each of the feature points 255 can be matched by scanning points of the second image 220b for matching a corresponding point of the feature point 255 of the first image 220a, at 123. Each point of the second image 220b can be scanned by points and lines in any suitable manner.

At 124, a similarity between the feature point 255 of the first image 220a and each scanned point of the second image 220b can be calculated. In some embodiments, the similarity, at 124, is calculated while scanning the points of the second image 220b. In some embodiments, the corresponding feature point 255 of second image 220b with a minimum sum of differences with the feature point 255 of the first image 220a can be selected as a corresponding point to the selected feature point 255.

Although shown and described as calculating the similarity of each point between the feature point 255 of the first image 220a and each scanned point of the second image 220b for purposes of illustration only, any other suitable manner can be applied in determining the corresponding feature point 255.

Figure 7:
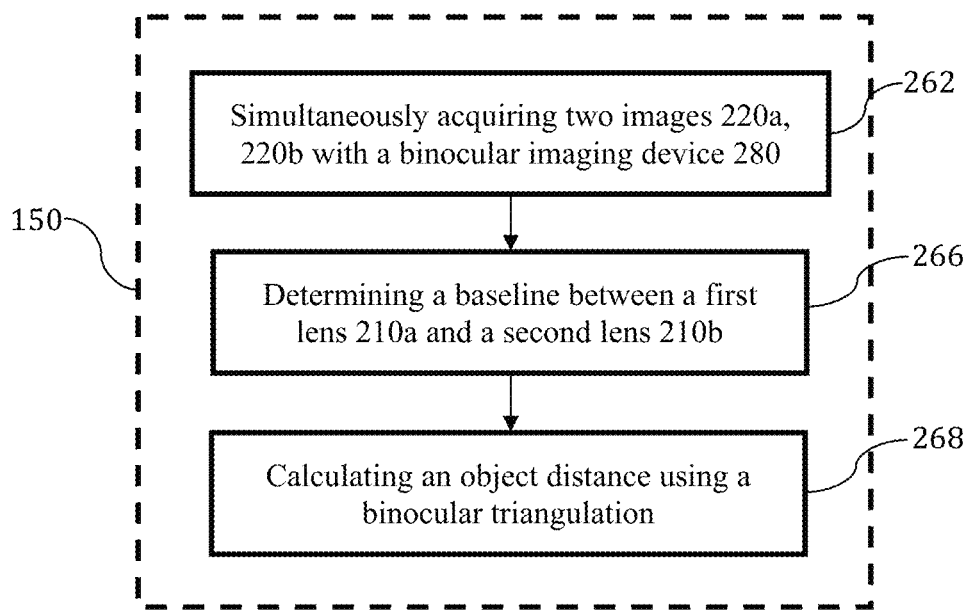
FIG. 7 is a detail flowchart illustrating another alternative embodiment of the method of FIG. 1, wherein a binocular mode of a mobile platform is used as the detection mode to acquire the object distance.

FIG. 7 illustrates another alternative embodiment of the detection method 100. Turning to FIG. 7, the binocular mode of the mobile platform 501 (shown in FIG. 16) is used to acquire the object distance, at 150. FIG. 7 shows that a first image 220a and a second image 220b can be acquired via the binocular imaging device 280, at 262.

The binocular imaging device 280 can acquire the first image 220a and the second image 220b simultaneously. The first image 220a and the second image 220b can be captured via respective lenses. Returning briefly to FIG. 3, for example, the first image 220a can be captured by the first lens 210a, and the second image 220b can be captured by the second lens 210b.

FIG. 7 also shows that the baseline between the first lens 210a and the second lens 210b can be determined, at 266. The baseline refers to a distance between the center of the first lens 210a and the center of the second lens 210b. The baseline can be configured such that the first lens 210a and the second lens 210b can capture images of the object 298 with at least a portion of overlapping area.

Again returning to FIG. 3, a triangle $O_rO_lA$ can be formed. The baseline T between the first lens 210a and the second lens 210b can comprise a base of the triangle $O_rO_lA$; whereas, the respective connection lines between centers $O_r$, $O_l$ of each lens 210a, 210b and the feature point 255 of the object 298 can comprise the remaining two sides of the triangle $O_rO_lA$. The object distance Z can be a height of the triangle $O_rO_lA$. Parallel lines 230a, 230b are shown as passing through the lenses 210a, 210b and in parallel with the height of the triangle $O_rO_lA$.

The object distance Z can be calculated using a binocular triangulation. An exemplary manner for performing the binocular triangulation includes using the calculated binocular disparity d. For example, the object distance Z can be found as a function of the binocular disparity d, the baseline T between the first lens 210a and the second lens 210b, and a ratified focal length f of the lenses 210a and 210b. Such function can be represented as:

$$Z = f\frac{T}{d} \qquad \text{Equation (6)}$$

where the baseline T is the distance between the center coordinates of the lenses 210a and 210b, the rectified focal length f is calculated from focal lengths of the lenses 210a and 210b, $d=X_l-X_r$ is the binocular disparity between the images 220a and 220b of the object 298, and $X_r$ is a point, of the second image 220b, matched a point represented by $X_l$ of the first image 220a.

Although shown and described as using the function of the binocular disparity d, the baseline T and the ratified focal length f for purposes of illustration only, the object distance Z can be determined by any other suitable manners.

Figure 8:
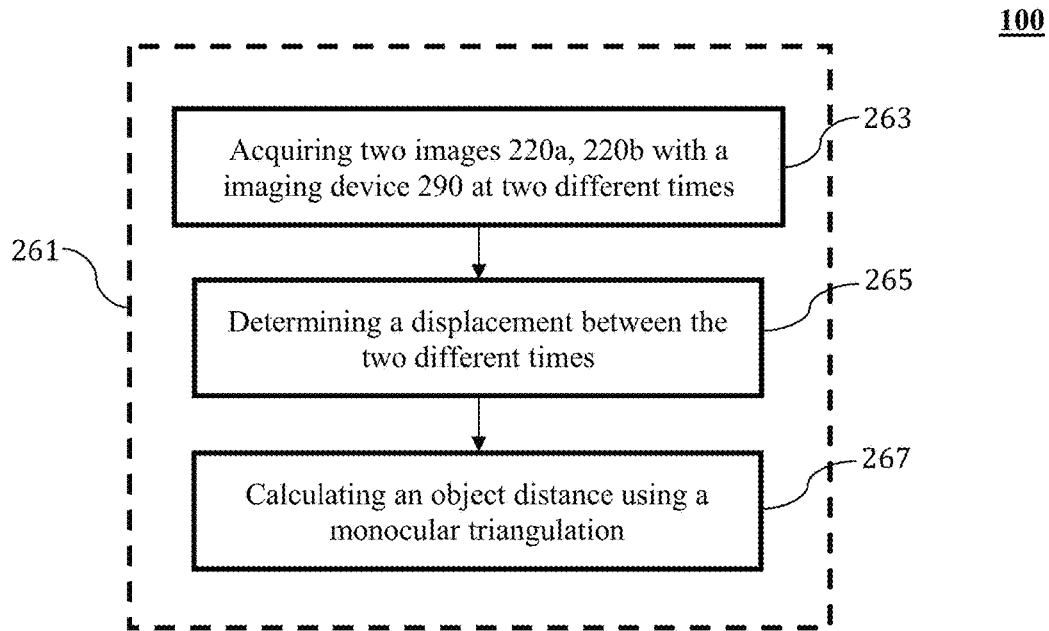
FIG. 8 is a detail flowchart illustrating another alternative embodiment of the method of FIG. 1, wherein a monocular mode of the mobile platform is used as the detection mode to acquire the object distance.

FIG. 8 illustrates another alternative embodiment of the detection method 100. Turning to FIG. 8, the monocular mode of the mobile platform 501 is used to acquire the object distance, at 261. In FIG. 8, the first image 220a and the second image 220b can be acquired via a monocular imaging device 290, at 263.

The monocular imaging device 290 can acquire the first image 220a and the second image 220b at two different, respective times via a same lens. In other words, the monocular imaging device 290 can capture the first image 220a at a first time and can capture the second image 220b at a second time that is different from the first time. The first and second times can be separated by a time interval. In some embodiments, the time interval can be predetermined interval, such as a fixed time interval and/or a variable time interval that can vary, for example, based upon an altitude of the mobile platform 501. In some embodiments, the predetermined interval is sufficient to generate an overlapping area between the first image 220a and the second image 220b.

Although shown and described as using the monocular image device 290 for capturing the first image 220a and the second image 220b, any other type of imaging device can be used to capture the images, e.g., a binocular imaging device 280 (shown in FIG. 3). In case of the binocular imaging device 280, for example, the first image 220a and the second image 220b can be captured by a same lens, e.g., either a first lens 210a or a second lens 210b (shown in FIG. 3). Alternatively, the first image 220a can be captured by the first lens 210a, and the second image 220b can be captured by the second lens 210b. No matter which lens 210a, 210b is used to capture the first image 220a and the second image 220b, the first image 220a and the second image 220b in some embodiments can be captured at the different times.

Figure 9:
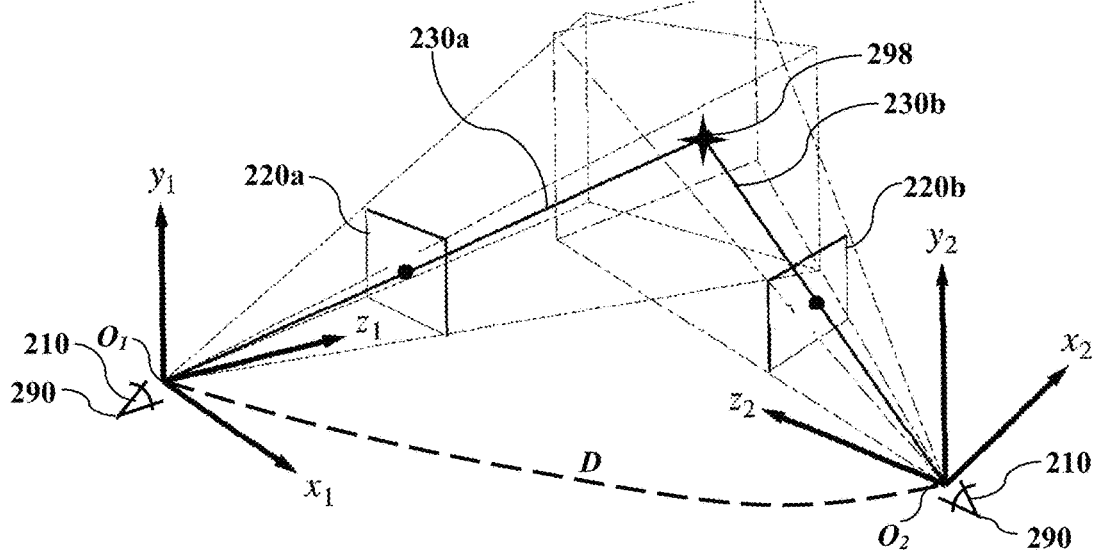
FIG. 9 is an exemplary diagram illustrating an alternative embodiment of the triangulation method, wherein the disparity of FIG. 1 is determined by monocular triangulation.

FIG. 9 illustrates an alternative embodiment of the exemplary triangulation method 200. Turning to FIG. 9, a monocular triangle can be formed by a displacement D and two connection lines 230a, 230b between each position of the lens 210 at two different respective times and the object 298.

In FIG. 9, the imaging device 290 is shown as having at least one lens 210 for capturing the images 220a, 220b at two different times. At a first time, the imaging device 290 and the lens 210 can be positioned in a first coordinate system of $x_1y_1z_1$ with an origin $O_1$. At a second time, the imaging device 290 and the lens 210 can be positioned in a second coordinate system of $x_2y_2z_2$ with an origin $O_2$. Between the two coordinate systems $x_1y_1z_1$, $x_2y_2z_2$, a rotation array R can be measured and a transformation array T can be calculated in a manner set forth with reference to FIG. 13. The displacement D between the coordinate systems $x_1y_1z_1$, $x_2y_2z_2$ can be calculated based on the rotation array R and/or the transformation array T.

In some embodiments, the displacement D can be a curved line as shown in FIG. 9. However, because a time elapse between the different times can be limited, the displacement D can be minimal relative to a distance to the object 298. Thus, the displacement D can be regarded as a straight line in a triangle $O_1$ $O_2$ A. The triangle $O_1$ $O_2$ A can be formed with the displacement D as the baseline and the respective connection lines 230a, 230b as the other two sides of the triangle $O_1$ $O_2$ A.

The imaging device 290 can be either a binocular imaging device or a monocular imaging device. An exemplary binocular imaging device 280 is shown and described above with reference to FIG. 3. In case of the binocular imaging device 280, each lens 210 of the binocular imaging device can be used to capture either of the images 220a, 220b, and a baseline between the lenses 210 can be taken into a consideration when calculating the displacement D.

The object distance between the imaging device 290 and the object 298 can be estimated as a height of the triangle $O_1$ $O_2$ A considering the displacement D of the imaging device 290 is limited. The object distance Z can be calculated using a similar triangulation as set forth with reference to FIG. 3. An exemplary manner includes using the calculated displacement D. The object distance Z can be found as a function of the disparity d, the displacement D between the first time and the second time, and a ratified focal length f as set forth herein. Such function can be represented as:

$$Z = f\frac{D}{d} \qquad \text{Equation (7)}$$

where D is the displacement of the imaging device 290, f is the focal length of the lens 210 $d=X_l-X_r$ is the disparity between the images 220a and 220b of the object 298, and $X_r$ is a point, of the second image 220b, matched a point represented by $X_l$ of the first image 220a.

Figure 10:
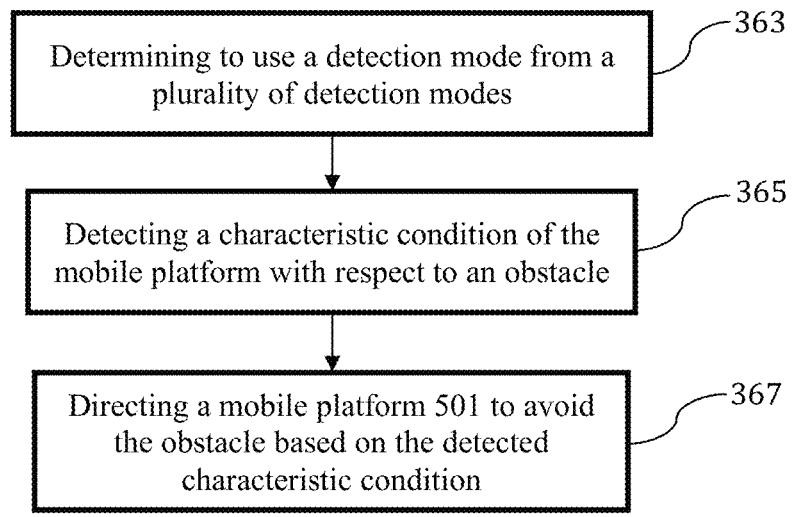
FIG. 10 is a top-level flowchart illustrating an exemplary embodiment of a method for avoiding an obstacle, wherein a mobile platform is directed based on certain characteristic condition of the mobile platform with respect to the obstacle.

FIG. 10 illustrates an embodiment of an exemplary obstacle avoidance method 300. Turning to FIG. 10, an obstacle can be avoided by directing a mobile platform 501 (shown in FIG. 16) to move based on one or more characteristic conditions of the mobile platform 501 with respect to the obstacle. FIG. 10 shows that a detection mode of the mobile platform 501 can be determined from a plurality of detection modes for detecting the obstacle, at 363.

The obstacle can be the object 298 (shown in FIG. 1) in an operating environment of the mobile platform 501. The plurality of detection modes of the mobile platform 501 can include at least a binocular mode and/or a monocular mode. As shown and described herein, the determined detection mode can be used to detect the characteristic condition of the mobile platform 501, e.g., an object distance between the mobile platform 501 and the obstacle. Additionally and/or alternatively, the characteristic condition can include one or more other conditions of the mobile platform 501 with respect to the obstacle, e.g., a relative movement of the mobile platform 501. In some embodiments, the detection mode can be switched when certain conditions are met. The characteristic condition can be continuously checked or be checked at times in a predetermined interval.

The characteristic condition of the mobile platform 501 with respect to the obstacle can be detected, at 365, via the determined detection mode of the mobile platform 501. For example, a distance to the obstacle and a relative movement between the mobile platform 501 and the obstacle can be detected by the mobile platform 501 via the determined detection mode.

The mobile platform 501 can be self-directed to avoid the obstacle based on the detected characteristic condition, at 367. The mobile platform 501, for example, can change a moving direction of the mobile platform 501, a velocity of the mobile platform 501 and/or an attitude of the mobile platform 501 and the like. Additional detail regarding directing the mobile platform 501 will be set forth with reference to FIG. 16.

Figure 11:
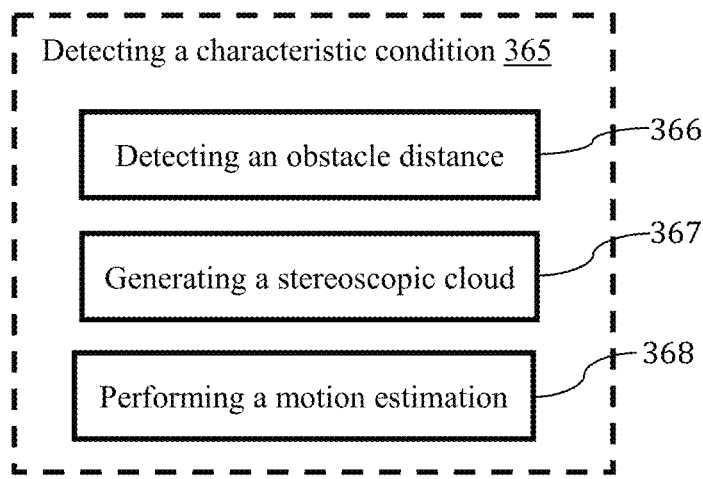
FIG. 11 is a detail flowchart illustrating an alternative embodiment of the method of FIG. 10, wherein the characteristic condition of the mobile platform is detected.

FIG. 11 illustrates an alternative embodiment of the obstacle avoidance method 300. The characteristic condition of the mobile platform 501 (shown in FIG. 16) can be detected, at 365, as discussed above with reference to FIG. 10. In FIG. 11, for example, the detecting the characteristic condition is shown as including detecting an obstacle distance (or object distance), at 366.

The obstacle can be the object 298 (shown in FIG. 1) that is found in an operating environment of the mobile platform 501. The obstacle can include, but is not limited to, a mountain, a hill, a building, a tree, an animal, a terrain, a vehicle and any other object that can be found in adjacency of the mobile platform 501. The obstacle distance can be detected via any manner set forth herein, e.g., via a selected detection mode.

Although shown and described as being a distance between the mobile platform 501 to the obstacle for purposes of illustration only, the obstacle distance can refer to a respective distance from the mobile platform 501 to each of a plurality of feature points 255 (shown in FIG. 12) of the obstacle.

Additionally and/or alternatively, the detecting the characteristic condition can include generating a stereoscopic cloud of the obstacle, at 367. The stereoscopic cloud can be a three dimensional view of the obstacle from a perspective of the mobile platform 501. In other words, the stereoscopic cloud can include not only x-y plane information but also distance information. The stereoscopic cloud can be generated in a manner shown and described with reference to FIG. 12.

In some embodiments, detection of the characteristic condition can include performing a motion estimation, at 368, of the mobile platform 501. The motion estimation can include, but is not limited to, estimating a velocity, a direction and/or a rotation of the mobile platform 501. The motion estimation can be performed with facilitation of certain other devices coupled or otherwise associated with the mobile platform 501, e.g., an IMU (now shown). Additional detail regarding the motion estimation will be set forth with reference to FIG. 13.

Figure 12:
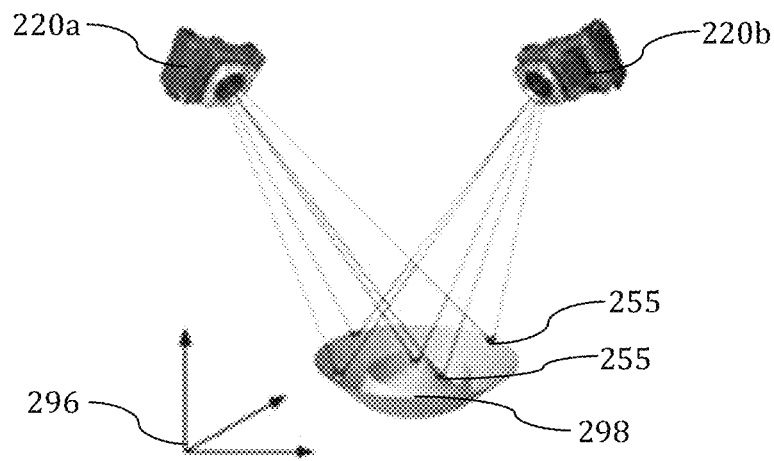
FIG. 12 is an exemplary diagram illustrating an embodiment of another triangulation method, wherein a plurality of feature points are selected for determining the disparity.

FIG. 12 illustrates an alternative embodiment of the triangulation method 200. Turning to FIG. 12, a plurality of feature points 255 are selected from an object 298 for determining the disparity. In FIG. 12, the triangulation can be either a binocular triangulation or a monocular triangulation. In case of the binocular triangulation, the feature points 255 can be captured via a first lens 210a and a second lens 210b of a binocular imaging device 280 (shown in FIG. 3). In case of the monocular triangulation, the feature points 255 can be captured via a same lens 210 of a monocular image device 290 (shown in FIG. 9) at two different times.

The feature points 255 can be represented in a coordinate system 296. Coordinates for each of the feature points 255 can represent a space position of each of the feature points 255 and can be determined based on a distance being detected based on two images captured at two different times for a monocular mode or at two different positions for a binocular mode.

As shown and described herein, x-y positions of the feature points 255 of the first image 220a (shown in FIGS. 3 and 9) can be known because the x-y positions are selected from the first image 220a. The x-y positions of the features points 255 on a second image 220b (shown in FIGS. 3 and 9) can be found via matching the feature points 255 from the first image 220a to the second image 220b. In other words, relative to the binocular imaging device 280 or the monocular imaging device 290, each point in the x-y plane of an x-y-z coordinate system 296 can be known. In the x-y plane, the feature points 255 can be represented with $\{(x_1^1, y_1^1), (x_2^1, y_2^1), \{(x_3^1, y_3^1), \ldots, \{(x_n^1, y_n^1)\}$.

Additionally, the object distance from the binocular imaging device 280 or the monocular imaging device 290 to each of the feature points can be determined via the triangulation processes disclosed above with reference to FIG. 3 or FIG. 9. Therefore, a stereoscopic cloud $\{P_1, P_2, P_3 \ldots P_n\}$ can be constructed based on the $\{(x_1^1, y_1^1), (x_2^1, y_2^1), \{(x_3^1, y_3^1), \ldots, \{(x_n^1, y_n^1)\}$ and the object distances for each of the feature points. Each Pi represents a stereoscopic point of the object 298 with respective to the imaging device 280, 290.

Although shown and described as using the x-y-z coordinate system for representing a spatial point for purposes of illustration only, any other suitable spatial three-dimensional coordinate system can be utilized for construction the stereoscopic cloud.

Figure 13:
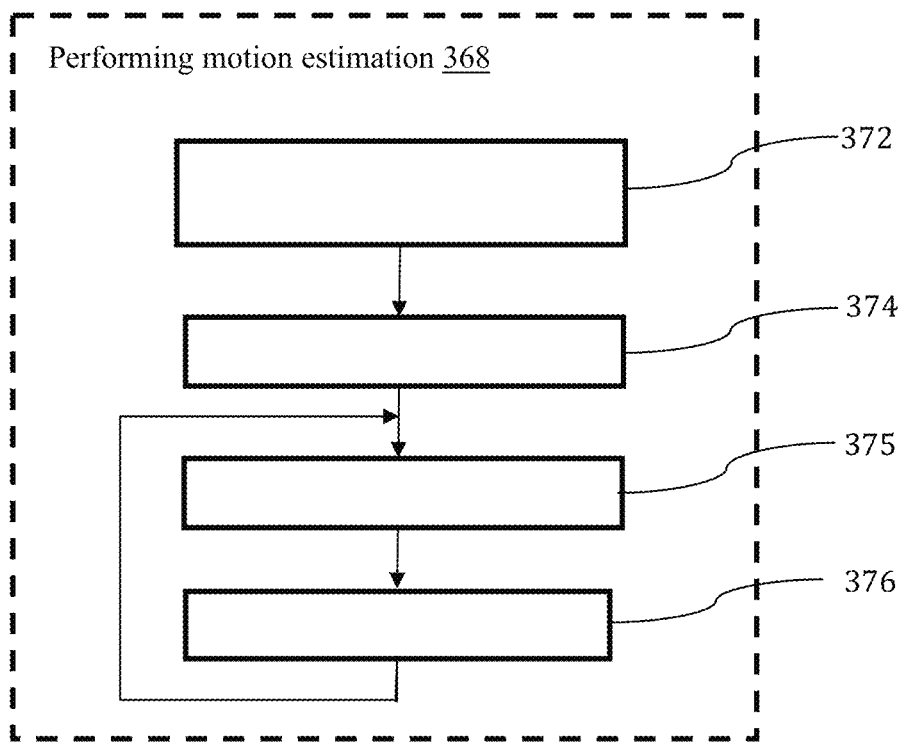
FIG. 13 is a detail flowchart illustrating another alternative embodiment of the method of FIG. 10, wherein motion estimation of the mobile platform is performed.

FIG. 13 illustrates an alternative embodiment of the obstacle avoidance method 300. As illustrated in FIG. 13, a motion estimation of the mobile platform 501 (shown in FIG. 16) is performed, at 368, as set forth above with reference to FIG. 11. In FIG. 13, for example, a first stereoscopic image and a second stereoscopic image can be captured at two different times in a manner shown and described with reference to FIG. 8.

At 372, an IMU (not shown) can be used to acquire rotation measurements of the mobile platform 501 between the two stereoscopic images. The IMU is an electronic device for detecting a changes in rotational attributes, e.g., yaw, pitch, roll and the like. The rotation measurements can be represented with a three dimensional array R. With the rotation measurement array R, a relationship between a point cloud array of the first stereoscopic image and a projected point array of the second stereoscopic image can be represented as:

$$RP_j + T = \mu \begin{pmatrix} x_i \\ y_j \\ 1 \end{pmatrix} \quad \text{Equation (8)}$$

wherein R is a three-dimensional array representing the rotation measurements, Pj is a stereoscopic point of the first stereoscopic image, T represents a three-dimensional array of translation of the second frame to be calculated and μ is a random number acting as a factor.

To help ensure an accuracy of the relative rotation array as measured by the IMU, an interval between a first point in time at which the first frame is taken and a second point in time at which the second frame is taken can be relatively short.

In accordance with various embodiments, a stereoscopic cloud with multiple points can be used for determining motion characteristics, such as a translation array, for the mobile platform 501, at 374. For example, equations for at least two points can be joined for solving the array T.

Alternatively, both R and T can be calculated based on the projected points, e.g. when the measurement of R by using an IMU becomes unreliable. In this case, Equation (8) can include more unknowns. Thus, more points can be used for jointly solving the arrays R and T. Because of an additional complexity, this alternative approach of solving R and T can be more expensive than the approach of calculating only the transformation array T.

Empirically, errors and/or inaccuracies in matching the features points 255 between the first stereoscopic image and second stereoscopic image can results in accuracies in the calculated T. At 375, the calculated translation array T can be verified by introducing the array T into Equation 8 and calculating to determine a number of points that conform to the relationship defined in the Equation 8. For this purpose, another pair of points selected from the determined points can be used in solving the array T, at 374, and can be used to determine the number of points that conform to the relationship of Equation 8, at 378. This process iterates for a predetermined number of pairs of points, and the results can be a predetermined number of the arrays Ts accompanied with a count of points of conformance to Equation 8 for each of the arrays Ts.

At 376, the numbers of conformed points are compared, and an array T is chosen with the greatest number of conformed points. The chosen transformation, the array T, can be used to incrementally build a three-dimensional topographic map. The three-dimensional topographic map (or a raised-relief map or a terrain model) is a three-dimensional representation of a terrain, which can facilitates visual recognition of the terrain features. Thus, the three-dimensional topographic map can facilitate the mobile platform 501 with terrain information and avoid the surrounding obstacles in its navigation path.

Figure 14:
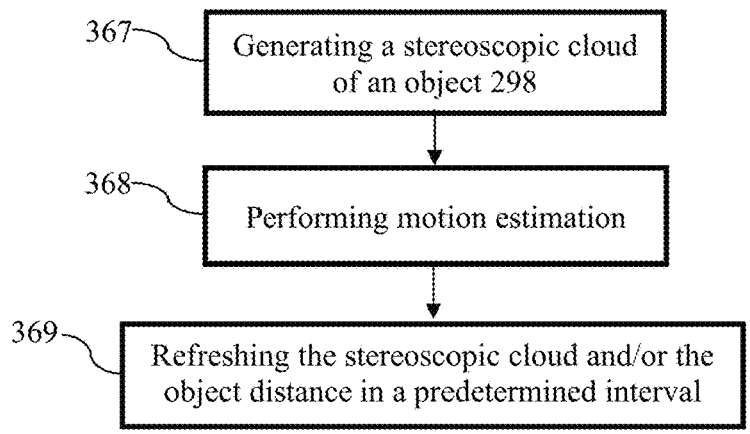
FIG. 14 is a detail flowchart illustrating another alternative embodiment of the method of FIG. 10, wherein a stereoscopic cloud and the object distance are refreshed in a predetermined interval.

FIG. 14 illustrates another alternative embodiment of the obstacle avoidance method 300. Turning to FIG. 14, the stereoscopic cloud and the object distance can be refreshed in a predetermined interval, at 369. The stereoscopic cloud and the object distance are refreshed from a perspective of an imaging device 503 (shown in FIG. 16). In FIG. 14, the stereoscopic cloud of the object 298 can be generated, at 367.

As shown and described herein, the stereoscopic cloud can be a three-dimensional view of an object 298 and can be generated based on a plurality of feature points 255 (collectively shown in FIG. 12) and corresponding object distances of the feature points 255. The stereoscopic cloud and the object distances can be acquired via a selected detection mode, either a binocular mode or a monocular mode. The detection mode is also known as visual detection mode because the detection mode relies on views, images captured with lenses of the imaging device 503, to determine the object distances and to generate the stereoscopic cloud.

A motion estimation of mobile platform 501 can be performed, at 368. As shown and described above with reference to FIGS. 4 and 13, the motion estimation can be performed based on rotation measurements of an IMU. The motion estimation can predict a future position of the imaging device 503 at a predetermined time, and thus, can be useful in avoiding the object 298 during use.

The IMU can introduce selected errors in predicting the future position of the imaging device 503. The errors can include, e.g., an accumulated error because the IMU can continually add detected changes to a base being formed with the stereoscopic cloud and the object distances. In an effort to address the accumulated error, the stereoscopic cloud and the object distances can be refreshed at a predetermined interval, at 369.

In some embodiments, the stereoscopic cloud and/or the object distance can be refreshed by acquiring the stereoscopic cloud and/or the object distance via the visual detection mode. When refreshing, a first image 220*a* and a second image 220*b* (shown in FIGS. 3 and 9) can be simultaneously captured when the binocular mode is determined or at two different, respective times when the monocular mode is determined. The object distance can be determined in a manner set forth above with reference to FIG. 7 or FIG. 8, and the stereoscopic cloud can be generated in a manner set forth with reference to FIG. 11.

Although shown and described as using a currently determined detection mode for refreshing for purposes of illustration only, the detection mode can be changes based on a newly acquired disparity. In some embodiments, when the stereoscopic cloud and the distance are refreshed, the detection mode can be checked and changed, if necessary, in a manner set forth with reference to FIG. 4. If the detection mode is changed, the newly determined detection mode can be used in acquiring the stereoscopic cloud and the object distance.

Figure 15:
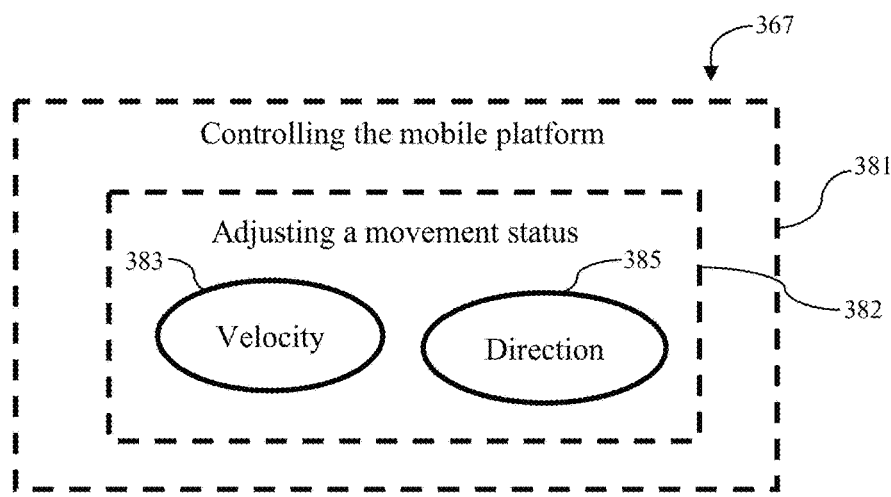
FIG. 15 is a block diagram illustrating another alternative embodiment of the method of FIG. 10, wherein the mobile platform is directed based on a detected characteristic condition.

FIG. 15 illustrates another alternative embodiment of the obstacle avoidance method 300. Turning to FIG. 15, the mobile platform 501 is directed based on a detected characteristic condition to avoid an obstacle. In FIG. 15, for example, the mobile platform 501 can be controlled based on the detected characteristic condition, at 381.

The characteristic condition can include a stereoscopic cloud, an obstacle distance and/or a motion estimation. As shown and described herein, the stereoscopic cloud, the obstacle distance and/or the motion estimation can be acquired via a binocular mode and/or a binocular mode of the mobile platform 501.

The mobile platform 501 can be controlled by adjusting a movement status of the mobile platform 501, at 382. The movement status can include a velocity 383 and/or a direction 385 of the mobile platform 501. The velocity 383 can be controlled via an acceleration or deceleration of the mobile platform 501.

Although shown and described as adjusting the velocity 383 and/or the direction 385 for purposes of illustration only, other functions of the mobile platform 501 can be activated to avoid the obstacle, e.g., any maneuver of the mobile platform 501 for avoid the obstacle. Although shown and described as avoiding a selected obstacle for purposes of illustration only, multiple obstacles can be detected and avoided via the manner set forth herein.

Figure 16:
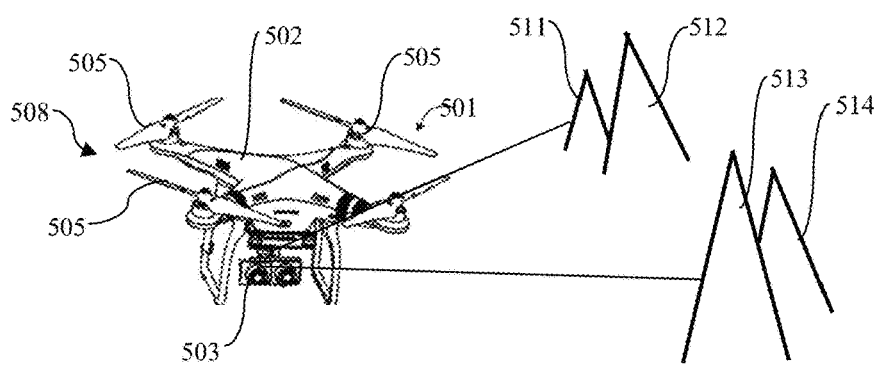
FIG. 16 is a diagram illustrating an exemplary embodiment of a mobile platform for implementing the method of FIG. 10, wherein the mobile platform automatically detects and avoids one or more obstacles.

FIG. 16 illustrates an embodiment of an exemplary obstacle avoidance system 500. Turning to FIG. 16, a mobile platform 501 is shown as being capable of automatically detecting and/or avoiding a plurality of obstacles 511-514. In FIG. 16, the mobile platform 501 can be an Unmanned Aerial Vehicle ("UAV") 508 that has a plurality of propellers 505 for providing an airborne power for the UAV 508 to move in any spatial direction. A movement of the UAV 508 can be controlled via one or more processors (not shown) that can be enclosed in a fuselage 502 of the UAV 508.

In some embodiments, the one or more processors can operate, individually and/or collectively, to perform any process set forth herein for detecting and/or avoiding the obstacles 511-514. In some embodiments, the one or more processors can operate to acquire a characteristic conditions of the UAV 508 with respective to the obstacles 511-514 individually and/or simultaneously. The UAV 508 can automatically adjust its movement status based on the detected characteristic conditions to avoid the obstacles 511-514.

The characteristic conditions, as shown and described herein, can include an obstacle distance, a stereoscopic cloud and/or a motion estimation and can be acquired via any one of a plurality of detection modes of the UAV 508. The plurality of detection modes can include, e.g., a binocular mode and/or a monocular mode. Selection of the detection mode can be performed based on a disparity of images captured with a binocular imaging device 503.

The movement status of the UAV 508 can include a velocity and/or a moving direction of the UAV 508. The one or more processors can increase or decrease the velocity of the UAV 508 by an acceleration or a deceleration and/or change the moving direction of the UAV 508 according to the obstacle distance, the stereoscopic cloud and motion estimation of the UAV 508 to avoid each obstacle 511-514.

Logic and/or function steps set forth in any flowchart or otherwise described herein may be considered as a sequencing list of executable instructions used for implementing a logical function. Thus, the logic and/or function steps can be implemented in any non-transitory computer readable medium for an instruction execution system, apparatus or device. The instruction execution system, apparatus or device can include one or more processors that can operate individually or collectively to execute the instructions used for implementing the logical function set forth herein.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for assisting obstacle avoidance of a mobile platform, comprising:
   obtaining a disparity between two images of an obstacle;
   selecting, based on the disparity between the two images, a detection mode from a plurality of detection modes to detect information of the obstacle, the plurality of detection modes including a binocular mode and a monocular mode;
   detecting the information of the obstacle using the detection mode, including in response to the monocular mode being selected as the detection mode:
     capturing a first image and a second image using a lens of an imaging device at two different times with a predetermined monocular imaging interval at two different locations, both the first image and the second image containing the obstacle;
     determining a displacement of the imaging device between the two different locations via an inertial measurement unit (IMU); and
     calculating an obstacle distance via a monocular triangulation based on the first image, the second image, and the displacement, the information of the obstacle including the obstacle distance;
   controlling the mobile platform to avoid the obstacle based on the information of the obstacle.

2. The method of claim 1, further comprising:
   performing motion estimation of the imaging device;
   wherein controlling the mobile platform includes controlling the mobile platform to avoid the obstacle further based on the motion estimation.

3. The method of claim 2, wherein selecting, based on the disparity between the two images, the detection mode from the plurality of detection modes to detect information of the obstacle includes:
  comparing the disparity with a predetermined disparity threshold level; and
  selecting the monocular mode as the detection mode in response to the disparity being less than the predetermined disparity threshold level, and selecting the binocular mode as the detection mode in response to the disparity being greater than or equal to the predetermined disparity threshold level.

4. The method of claim 3,
  wherein obtaining the disparity comprises associating each feature point of a first one of the two images with a corresponding point of a second one of the two images;
  the method further comprising generating a three-dimensional (3D) stereoscopic cloud of the obstacle based on the feature points and the obstacle distance.

5. The method of claim 4, wherein controlling the mobile platform further comprises controlling the mobile platform to avoid the obstacle further based on the 3D stereoscopic cloud.

6. The method of claim 5, wherein controlling the mobile platform further comprises adjusting a movement status of the mobile platform.

7. The method of claim 6, wherein adjusting the movement status comprises changing or maintaining at least one of a velocity or a direction of the mobile platform.

8. The method of claim 3, wherein detecting the information of the obstacle using the detection mode includes in response to selecting the binocular mode as the detection mode:
  simultaneously capturing a third image with a first lens of the imaging device and capturing a fourth image with a second lens of the imaging device;
  determining a baseline between the first lens and the second lens; and
  calculating the obstacle distance using a binocular triangulation based on the third image, the fourth image, and the baseline.

9. The method of claim 3, wherein performing the motion estimation comprises performing the motion estimation with the binocular mode or the monocular mode.

10. The method of claim 9, wherein:
  performing the motion estimation comprises determining a motion transformation of the imaging device between different times; and
  determining the motion transformation comprises acquiring a velocity, a rotation, and an orientation of the imaging device for the motion transformation.

11. The method of claim 10, wherein acquiring the velocity, the rotation, and the orientation comprises acquiring the velocity, the rotation, and the orientation via the IMU.

12. The method of claim 1, wherein determining the displacement of the imaging device between the two different times includes:
  obtaining a first set of coordinates of the lens of the imaging device and a second set of coordinates of the lens at the two different times, respectively;
  determining the displacement based on the first set of coordinates and the second set of coordinates, a rotation array, and a transformation array.

13. The method of claim 1, wherein the displacement is a curved line.

14. The method of claim 1, wherein the displacement is a straight line.

15. The method of claim 1, wherein:
  obtaining the two images of the obstacle includes obtaining the two images of the obstacle by two lens of a binocular imaging device.

16. An unmanned aerial vehicle ("UAV"), comprising:
  a plurality of propellers for providing a lifting power; and
  one or more processors, individually or collectively, operate to:
    obtain a disparity between two images of an obstacle;
    select, based on the disparity between the two images, a detection mode from a plurality of detection modes to detect information of the obstacle, the plurality of detection modes including a binocular mode and a monocular mode;
    detect the information of the obstacle using the detection mode, including in response to the monocular mode being selected as the detection mode:
      capturing a first image and a second image using a lens of an imaging device at two different times with a predetermined monocular imaging interval at two different locations, both the first image and the second image containing the obstacle;
      determining a displacement of the imaging device between the two different locations via an inertial measurement unit (IMU); and
      calculating an obstacle distance via a monocular triangulation based on the first image, the second image, and the displacement, the information of the obstacle including the obstacle distance;
    control the UAV via the propellers to avoid the obstacle based on the information of the obstacle.

17. An apparatus for assisting obstacle avoidance of a mobile platform, comprising one or more processors, individually or collectively, operate to:
  obtain a disparity between two images of an obstacle;
  select, based on the disparity between the two images, a detection mode from a plurality of detection modes to detect information of the obstacle, the plurality of detection modes including a binocular mode and a monocular mode;
  detect the information of the obstacle using the detection mode, including in response to the monocular mode being selected as the detection mode:
    capturing a first image and a second image using a lens of an imaging device at two different times with a predetermined monocular imaging interval at two different locations, both the first image and the second image containing the obstacle;
    determining a displacement of the imaging device between the two different locations via an inertial measurement unit (IMU); and
    calculating an obstacle distance via a monocular triangulation based on the first image, the second image, and the displacement, the information of the obstacle including the obstacle distance;
  control the mobile platform to avoid the obstacle based on the information of the obstacle detected characteristic condition.

* * * * *